US012581200B2

(12) United States Patent
Braley et al.

(10) Patent No.: US 12,581,200 B2
(45) Date of Patent: Mar. 17, 2026

(54) CONTROL WINDOW CAMERA DIRECTION TO AVOID SATURATION FROM STRONG BACKGROUND LIGHT AND ACTIVELY ADJUST THE FRAME TIME ON THE SPINNING CAMERA TO ACHIEVE DIRECTIONAL CONTROL

(71) Applicant: Waymo LLC, Mountain View, CA (US)

(72) Inventors: Colin Braley, Mountain View, CA (US); Chase Salsbury, San Mateo, CA (US); Po-Chao Huang, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 1084 days.

(21) Appl. No.: 17/456,861

(22) Filed: Nov. 29, 2021

(65) Prior Publication Data

US 2023/0171503 A1 Jun. 1, 2023

(51) Int. Cl.
H04N 23/73 (2023.01)
G01S 7/497 (2006.01)
(Continued)

(52) U.S. Cl.
CPC ............. H04N 23/73 (2023.01); G01S 7/497 (2013.01); G01S 17/86 (2020.01); G01S 17/89 (2013.01);
(Continued)

(58) Field of Classification Search
CPC .......... H04N 23/73; H04N 7/18; H04N 23/71; G01S 7/497; G01S 17/86; G01S 17/89;
(Continued)

(56) References Cited

U.S. PATENT DOCUMENTS

| 7,839,272 B2 | 11/2010 | Saito |
| 8,363,124 B2 | 1/2013 | Mochida et al. |

(Continued)

FOREIGN PATENT DOCUMENTS

| CN | 208027571 | 10/2018 |
| CN | 109309792 | 12/2020 |

(Continued)

OTHER PUBLICATIONS

Peter Chondro, et al., "Auto-Quantification of Various Contributing Factors on LiDAR-Camera Modalities Toward Autonomous Driving Environment," 2018 IEEE International Conference on Consumer Electronics-Taiwan (ICCE-TW), https://ieeexplore.ieee.org/abstract/document/8448860, May 2018.
(Continued)

*Primary Examiner* — Seung C Sohn
(74) *Attorney, Agent, or Firm* — McDonnell Boehnen Hulbert & Berghoff LLP

(57) ABSTRACT

Example embodiments relate to taking images at certain predetermined angles in order to have consistent exposure throughout the images. An example embodiment includes a method. The method includes determining, using a lidar device, light intensity information of a surrounding environment of the lidar device. The light intensity information includes a plurality of angles within a threshold range of light exposure. The method also includes determining rotation times associated with each of the angles within the threshold range of light exposure. Further, the method includes based on the rotation times associated with each of the angles within the threshold range of light exposure, determining a plurality of target image times. In addition, the method includes capturing, by a camera system, a plurality of images at the plurality of target image times.

20 Claims, 12 Drawing Sheets

(51) Int. Cl.

| | | |
|---|---|---|
| *G01S 17/86* | (2020.01) | |
| *G01S 17/89* | (2020.01) | |
| *G01S 17/931* | (2020.01) | |
| *H04N 7/18* | (2006.01) | |
| *H04N 23/71* | (2023.01) | |

(52) U.S. Cl.
  CPC ............. *G01S 17/931* (2020.01); *H04N 7/18* (2013.01); *H04N 23/71* (2023.01); *G01S 2007/4975* (2013.01)

(58) Field of Classification Search
  CPC .......... G01S 17/931; G01S 2007/4975; G01S 7/4817; G01S 17/88; G01J 1/42
  See application file for complete search history.

(56) References Cited

U.S. PATENT DOCUMENTS

| | | | |
|---|---|---|---|
| 8,421,909 B2 | 4/2013 | Mochida et al. | |
| 8,836,922 B1 * | 9/2014 | Pennecot | G01S 17/42 356/9 |
| 9,445,057 B2 * | 9/2016 | May | G06T 7/70 |
| 9,736,364 B2 | 8/2017 | Han | |
| 10,148,354 B2 | 12/2018 | Oshima et al. | |
| 10,558,873 B2 | 2/2020 | Hermalyn et al. | |
| 10,582,131 B2 | 3/2020 | Nakayama | |
| 10,999,539 B2 | 5/2021 | Wendel et al. | |
| 11,057,570 B2 | 7/2021 | Choi | |
| 11,860,305 B2 * | 1/2024 | Droz | G01S 17/931 |
| 2019/0191974 A1 | 6/2019 | Talbert et al. | |
| 2019/0243376 A1 | 8/2019 | Davis et al. | |
| 2020/0213581 A1 | 7/2020 | Lu et al. | |
| 2020/0397239 A1 | 12/2020 | Talbert et al. | |
| 2021/0199806 A1 | 7/2021 | Watson et al. | |
| 2021/0201070 A1 | 7/2021 | Omari et al. | |
| 2022/0329739 A1 * | 10/2022 | Kaneko | H04N 23/672 |

FOREIGN PATENT DOCUMENTS

| | | |
|---|---|---|
| CN | 109167929 | 2/2021 |
| CN | 113016175 | 6/2021 |
| EP | 3 806 044 | 4/2021 |
| KR | 101241225 | 3/2013 |
| KR | 101660878 | 9/2016 |
| WO | WO 2007/057498 | 5/2007 |

OTHER PUBLICATIONS

Simon Schulz, et al., "Using Brightness Histogram to perform Optimum Auto Exposure," WSEAS Transactions on System and Control, vol. 2, Issue 2, Feb. 2007.

\* cited by examiner

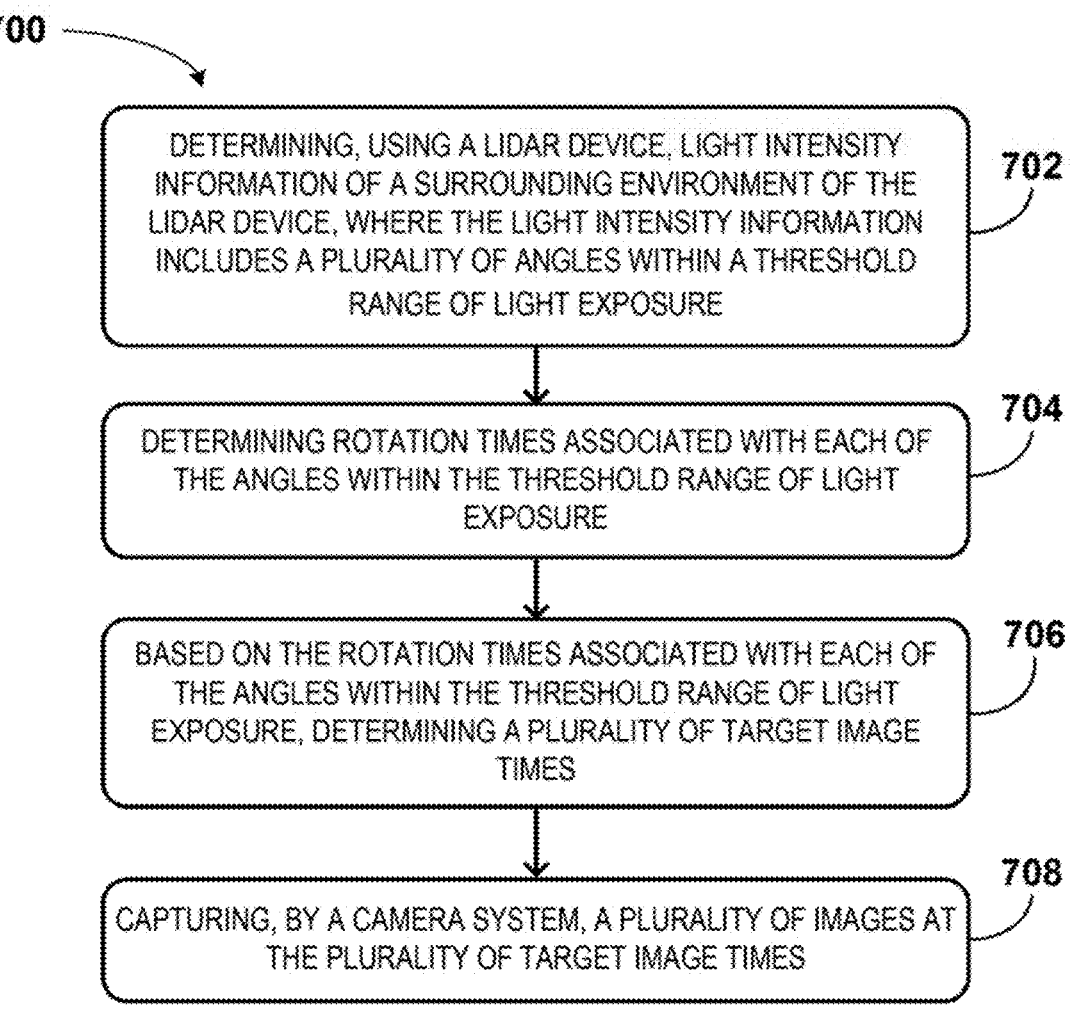

700

702

DETERMINING, USING A LIDAR DEVICE, LIGHT INTENSITY INFORMATION OF A SURROUNDING ENVIRONMENT OF THE LIDAR DEVICE, WHERE THE LIGHT INTENSITY INFORMATION INCLUDES A PLURALITY OF ANGLES WITHIN A THRESHOLD RANGE OF LIGHT EXPOSURE

704

DETERMINING ROTATION TIMES ASSOCIATED WITH EACH OF THE ANGLES WITHIN THE THRESHOLD RANGE OF LIGHT EXPOSURE

706

BASED ON THE ROTATION TIMES ASSOCIATED WITH EACH OF THE ANGLES WITHIN THE THRESHOLD RANGE OF LIGHT EXPOSURE, DETERMINING A PLURALITY OF TARGET IMAGE TIMES

708

CAPTURING, BY A CAMERA SYSTEM, A PLURALITY OF IMAGES AT THE PLURALITY OF TARGET IMAGE TIMES

CONTROL WINDOW CAMERA DIRECTION TO AVOID SATURATION FROM STRONG BACKGROUND LIGHT AND ACTIVELY ADJUST THE FRAME TIME ON THE SPINNING CAMERA TO ACHIEVE DIRECTIONAL CONTROL

BACKGROUND

Unless otherwise indicated herein, the materials described in this section are not prior art to the claims in this application and are not admitted to be prior art by inclusion in this section.

Cameras and image sensors are devices used to capture images of a scene. Some cameras (e.g., film cameras, etc.) chemically capture an image on film. Other cameras (e.g., digital cameras, etc.) electrically capture image data (e.g., using a charge-coupled device (CCD), complementary metal-oxide-semiconductor (CMOS) sensors, etc.). Images captured by cameras can be analyzed to determine their contents. For example, a processor may execute a machine-learning algorithm in order to identify objects in a scene based on a library of previously classified objects that includes objects' shapes, colors, sizes, etc. (e.g., such a machine-learning algorithm can be applied in computer vision in robotics or other applications, etc.).

Cameras can have a variety of features that can distinguish one camera from another. For example, cameras and/or images captured by cameras may be identified by values such as aperture size, f-number, exposure time, shutter speed, depth of field, focal length, International Organization for Standardization (ISO) sensitivity (or gain), pixel size, sensor resolution, exposure distance, etc. These features may be based on the lens, the image sensor, and/or additional facets of the camera. Further, these features may also be adjustable within a single camera (e.g., the aperture of a lens on a camera can be adjusted between photographs, etc.).

Further, cameras may be used in lidar device applications to detect if any dirt, water, or other debris is on a window enclosing the lidar. Dirt, water and other debris can also be referred to as "crud" and may negatively affect lidar readings. Among other artifacts, crud on the lidar's aperture can cause range degradation, inaccurate ranging, and blooming artifacts in the point cloud due to stray light. Some systems involve a camera mounted on a lidar device. The camera can be mounted inside the lidar device that images the lidar's enclosing window. This way, the camera can be used to detect any occlusions on the lidar device itself (water, dirt, debris, etc.).

SUMMARY

Embodiments described herein may relate to methods for controlling the direction of the camera by adjusting frame time to avoid inconsistent exposure. Example embodiments relate to a camera system programmed to take images at certain predetermined yaw angles and/or angles of elevation in order to have consistent exposure throughout the images.

In one aspect, a method is provided. The method includes determining, using a lidar device, light intensity information of a surrounding environment of the lidar device. The light intensity information includes a plurality of angles within a threshold range of light exposure. The method also includes determining rotation times associated with each of the angles within the threshold range of light exposure. Further, the method includes based on the rotation times associated with each of the angles within the threshold range of light exposure, determining a plurality of target image times. In addition, the method includes capturing, by a camera system, a plurality of images at the plurality of target image times.

In another aspect, a non-transitory, computer-readable medium having instructions stored thereon is provided. The instructions, when executed by a processor, cause the processor to execute a method. The method includes determining, using a lidar device, light intensity information of a surrounding environment of the lidar device. The light intensity information includes a plurality of angles within a threshold range of light exposure. The method also includes determining rotation times associated with each of the angles within the threshold range of light exposure. Further, the method includes based on the rotation times associated with each of the angles within the threshold range of light exposure, determining a plurality of target image times. In addition, the method includes capturing, by a camera system, a plurality of images at the plurality of target image times.

In an additional aspect, an optical system is provided. The optical detector system includes an optical component. The optical detector system also includes an image sensor configured to receive light from a scene via the imaging optic. Further, the optical detector system includes a controller configured to perform an imaging routine. The imaging routine includes determining, using a lidar device, light intensity information of a surrounding environment of the lidar device. The light intensity information includes a plurality of angles within a threshold range of light exposure. The imaging routine also includes determining rotation times associated with each of the angles within the threshold range of light exposure. Further, the imaging routine includes based on the rotation times associated with each of the angles within the threshold range of light exposure, determining a plurality of target image times. In addition, the imagining route includes capturing, by a camera system, a plurality of images at the plurality of target image times.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 7 is an illustration of a method, according to an example embodiment.

DETAILED DESCRIPTION

Figure 1:
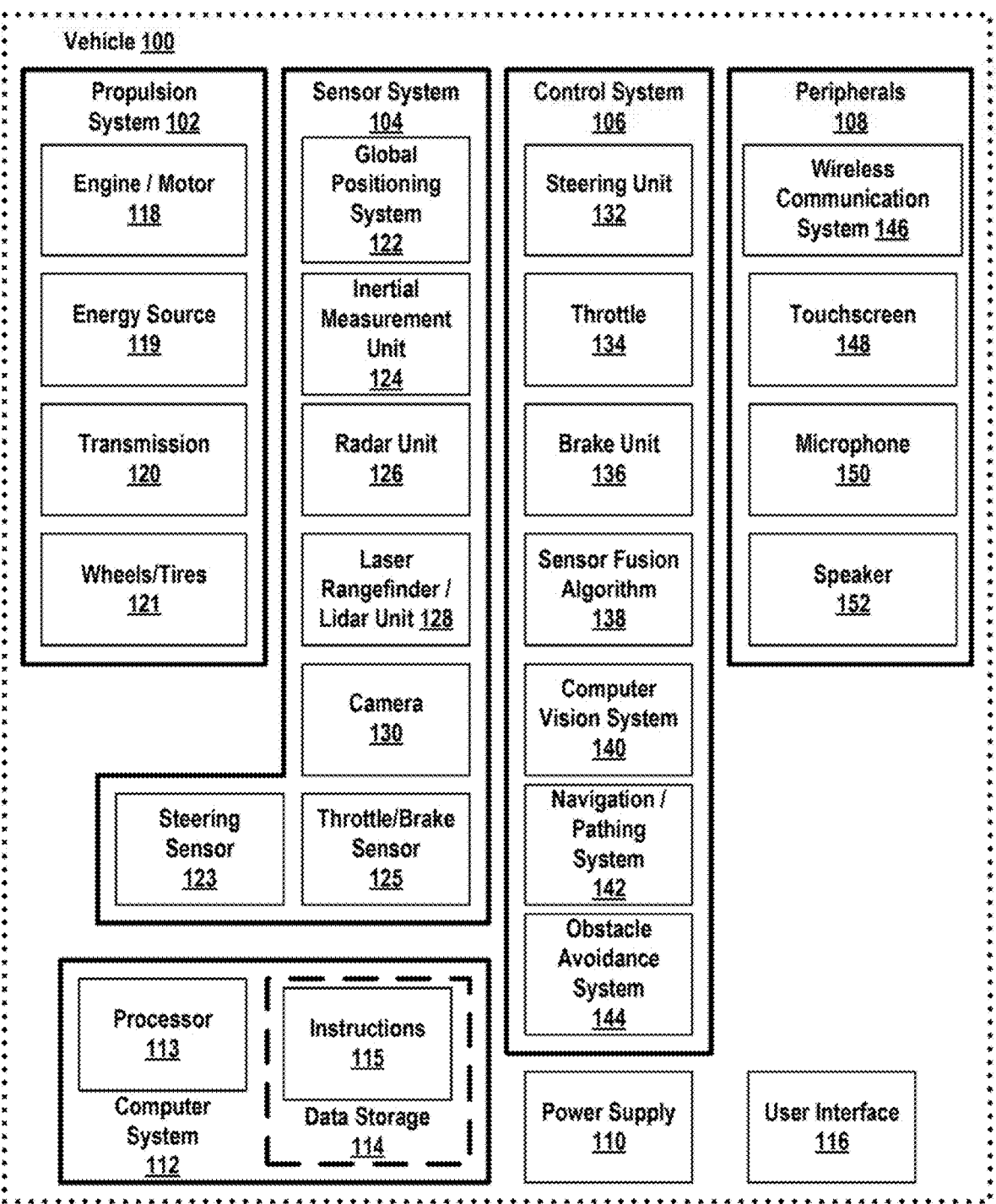
FIG. 1 is a functional block diagram illustrating a vehicle, according to example embodiments.
Figure 2A:
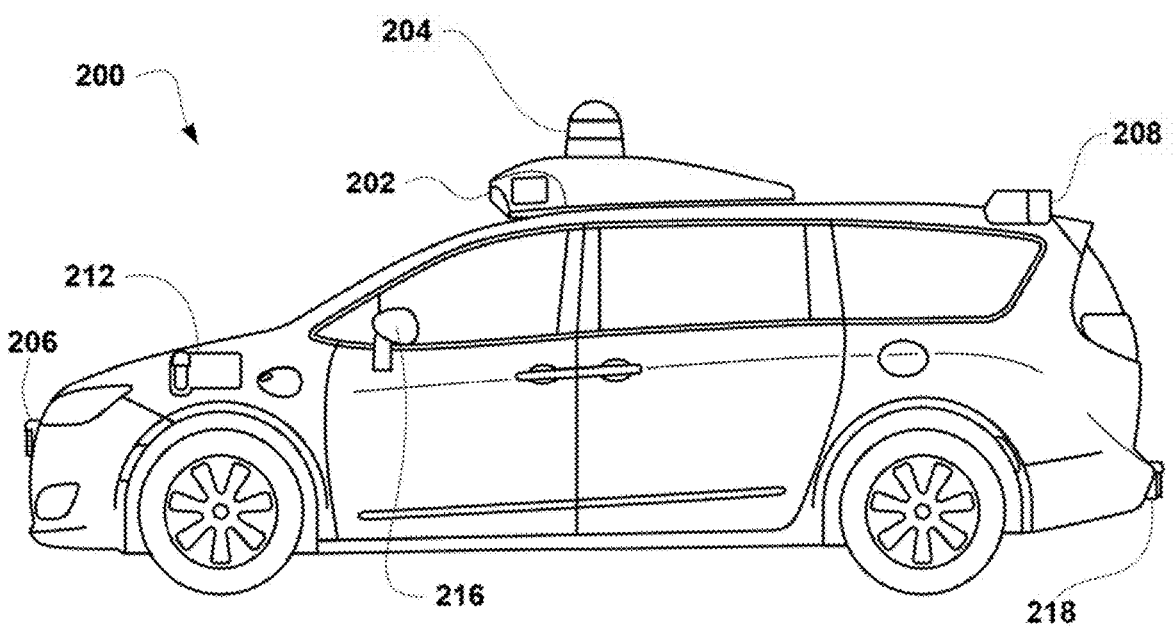
FIG. 2A is an illustration of a physical configuration of a vehicle, according to example embodiments.
Figure 2B:
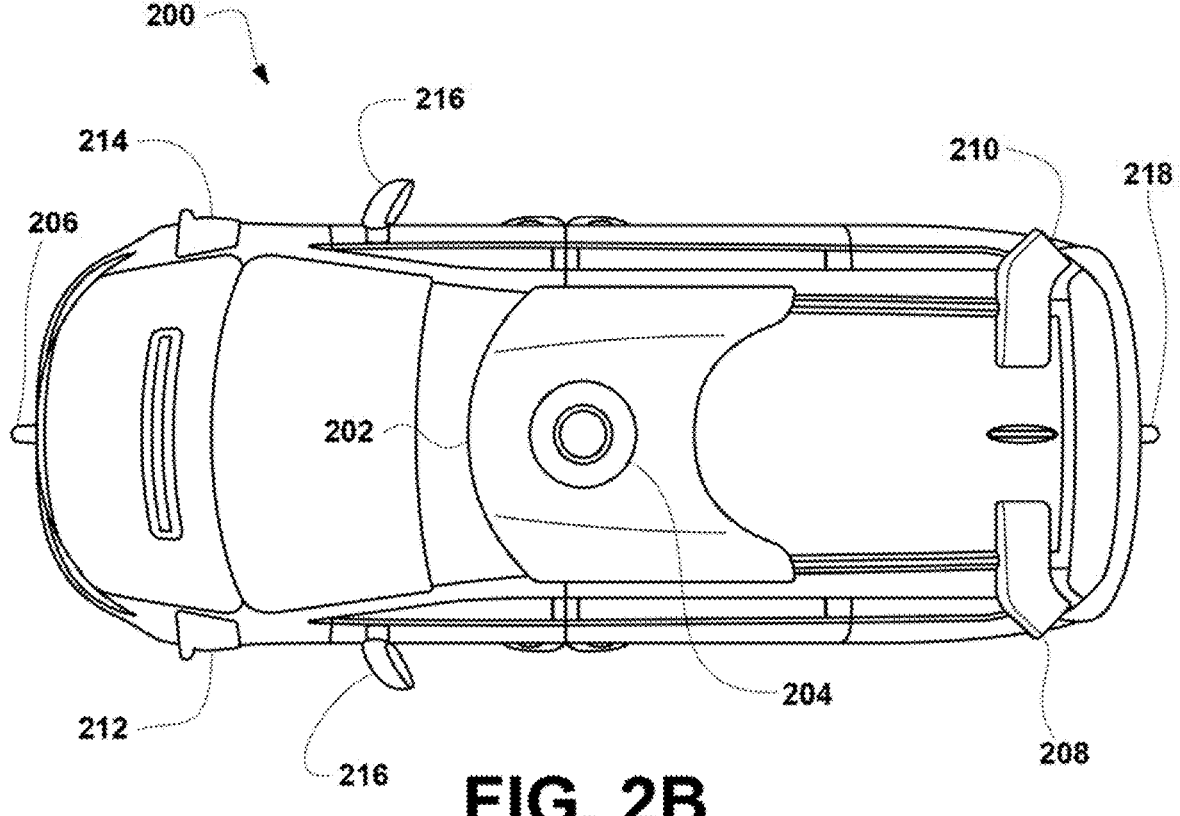
FIG. 2B is an illustration of a physical configuration of a vehicle, according to example embodiments.
Figure 2C:
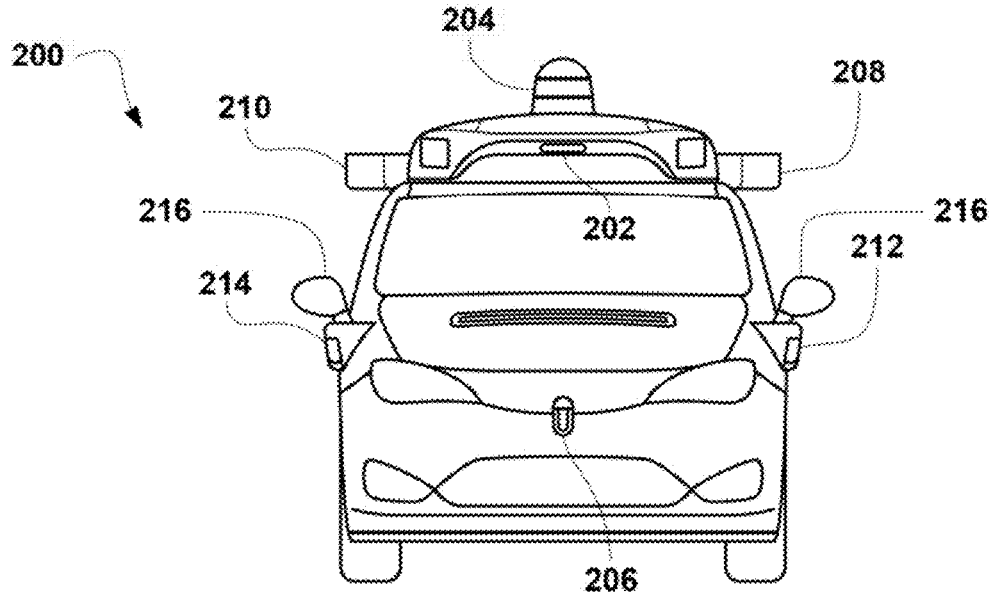
FIG. 2C is an illustration of a physical configuration of a vehicle, according to example embodiments.
Figure 2D:
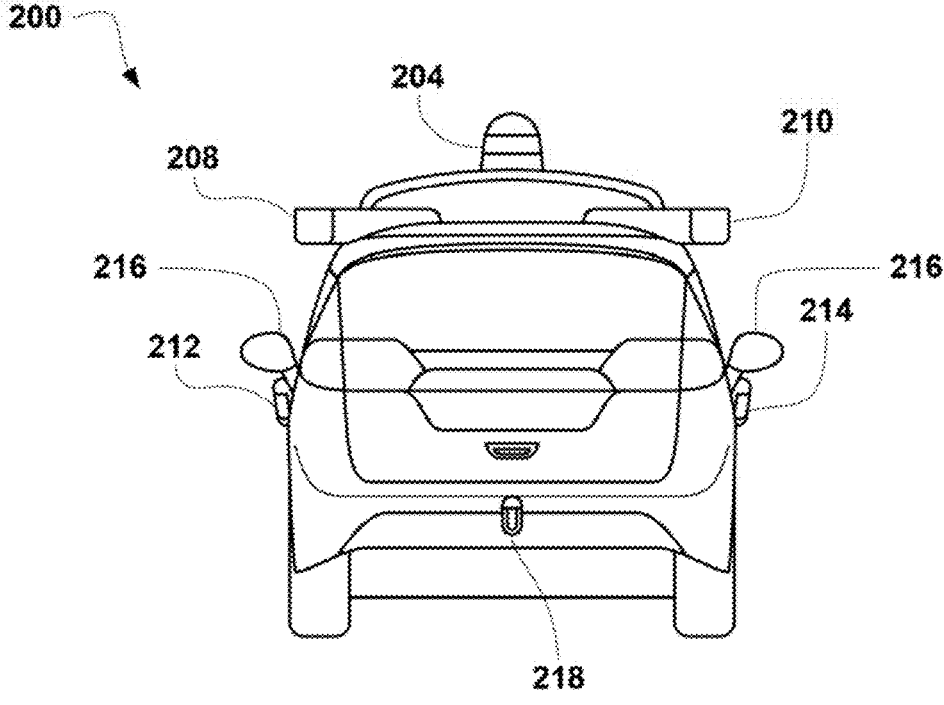
FIG. 2D is an illustration of a physical configuration of a vehicle, according to example embodiments.
Figure 2E:
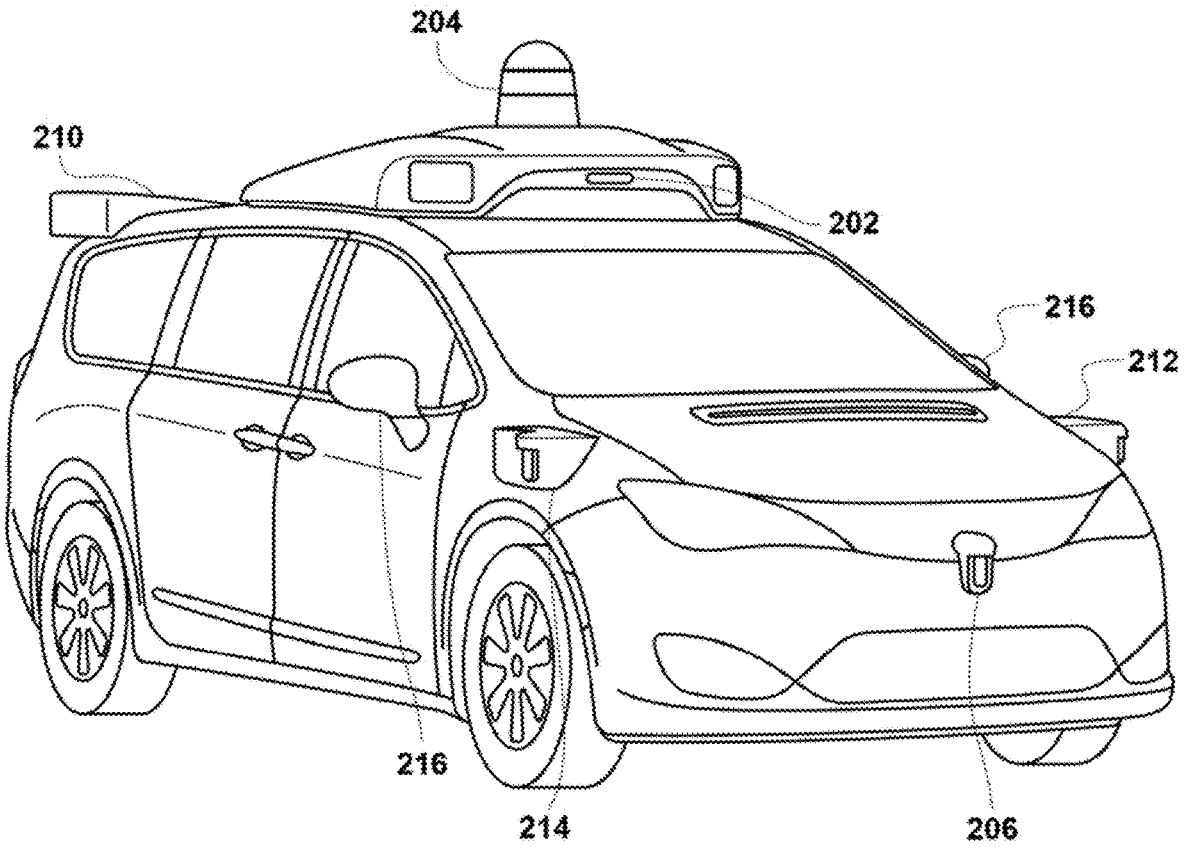
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, bicyclists, roadway surfaces, buildings, terrain, etc. Additionally, the one or more light emitters could emit light into a local environment of the lidar system itself. For example, light emitted from the one or more light emitters could interact with a housing of the lidar system and/or surfaces or structures coupled to the lidar system. And in some cases, the lidar system could be mounted to a vehicle, in which case the one or more light emitters could be configured to emit light that interacts with objects within a vicinity of the vehicle. Further, the light emitters could include optical fiber amplifiers, laser diodes, light-emitting diodes (LEDs), among other possibilities.

Lidar systems include multiple components used to capture images. For example, some lidars may include a dome to enclose and protect the other components of the lidar and may further include a window for the lidar to operate out of. In some instances, the window may be occluded by debris, damaged, misaligned, etc. during fabrication, during assembly, or in the course of normal use. Cameras may be used in lidar applications to detect if any dirt, water, or other debris (e.g. dust, soil, mud, insects or other types of organic or inorganic matter, etc.) is on the lidar dome, or if the lidar dome is damaged (e.g. cracked, fractured, etc.). Dirt, water and other debris can also be referred to as "crud" and may negatively affect lidar readings. Some systems involve a camera mounted inside a lidar device that images the lidar's enclosing dome window. In such a configuration, the camera can see any occlusions on the lidar itself (water, dirt, other debris, etc.). The camera may spin with the lidar to detect when crud is occluding any portion of the lidar window. The cameras can be referred to as cameras, crud cameras, or as obscuration-detection cameras.

One technique currently used during operation is for the camera to take as many images as possible while the system spins. Therefore, the images are taken at different angles. However, depending on the environment around the vehicle, images taken at some yaw angles and angles of elevation may be over or under exposed. For example, consider the case of a car leaving a tunnel on a sunny day. When the camera is pointed back into the tunnel, the ambient illumination is dark so a longer light exposure time should be used to avoid an underexposed image. When the camera is pointing forward into the sun, a light short exposure time should be used to avoid an overexposed image. Over-exposed and under-exposed images cannot be used in any further computations and are therefore unusable. Although auto-exposure may be used to address the amount of exposure in an image, it should be noted that there may still be cases with regions in the field of view that cause saturation.

Example embodiments presented herein provide a camera system programmed to take images at certain predetermined yaw angles and/or angles of elevation in order to have consistent exposure throughout the images. The camera system can be any type of photosensitive instrument, such as a still camera, a video camera, a thermal imaging camera, a stereo camera, a night vision camera, etc., that is configured to capture images. Methods of the technique may determine which portions of the field of view should not be imaged by utilizing the lidar device. For example, while a vehicle is in operation, an associated lidar device (which may have a higher dynamic range than an obscuration-detection camera) may collect information from a surrounding scene. The surrounding scene can include an interior or exterior environment, such as inside a building or tunnel, or outside of the building. Additionally or alternatively, the surrounding scene could include a vicinity around and/or on a roadway. Examples of objects in the surrounding environment include, but are not limited to, other vehicles, traffic signs, pedestrians, bicyclists, roadway surfaces, buildings, terrain, etc. The associated lidar device can collect light intensity information from the surrounding scene in fixed-size yaw sectors. This intensity information may indicate the brightness of the surrounding scene (e.g., the brightness of the solar background in the surrounding scene, etc.) in the fixed-size yaw sectors. The brightness measurement can be used to determine an appropriate light exposure time for the obscuration detection camera, which varies with the camera's yaw angle. For example, an average brightness can be computed for each yaw sector. Then, the "average brightness" can be translated to "exposure time" with a precomputed lookup table. In additional embodiments, any mapping, such as fitting to a polynomial, can be used to translate the average brightness to an exposure time.

In a present embodiment, taking images at a certain angle may be achieved by actively changing the time that the camera takes the image based on the current lidar yaw angle and/or angle of elevation that is assigned to the system. The lidar software can keep track of the lidar angle, and the camera system can account for the angle and actively adjust image time so that the next image can be taken at a designated angle. Since cameras in this application are typically streaming cameras (i.e., a camera that can feed or stream an image or video in real time to or through a computer network, such as the Internet), angle lock may be achieved by increasing or reducing the blank lines associated with image readout. Blank lines do not include any image data, but can be a parameter of the camera module typically used to change frames per second. Specifically, the blank lines are adjusted to make the image readout take a longer amount of time or a shorter amount of time, which then affects when the next image is taken. Increasing the line number will increase the camera readout time, therefore delaying the next camera frame start time. Decreasing the line number will decrease the camera readout time, therefore speeding up the next camera frame start time. In an example sensor model, one additional blank line can delay the next frame by 54.792 micro seconds. In this way, by assuming a constant speed of lidar rotation, the angle that the image is taken at can be chosen by manipulating the time at which the image is taken. The images can then be used to determine if the lidar window is obstructed by crud. In an alternative embodiment, non-streaming cameras can also be used to capture images at a predetermined angle by increasing or reducing the blank lines associated with the image readout. The non-streaming camera can include at least one camera that stores the plurality of images to be processed at a later time.

As described herein, some embodiments may include determining, using a lidar device, light intensity information of a surrounding environment of the lidar device as the lidar device spins. The lidar device can include at least one high sensitivity photodiode to determine an average background brightness of the environment. The average background brightness can include an average amount of light exposure sensed by the high sensitivity photodiode. The light intensity information can further include a plurality of angles within a threshold range of light exposure. The threshold range of light exposure can be a range of desirable exposure time.

Some embodiments can then include determining rotation times associated with each of the angles within the threshold range of light exposure. The rotation times can be determined using the constant rotational speed of the lidar and the known angle that the lidar device is currently facing. Components of the lidar device can keep track of the angle the lidar device is facing. Based on the rotation times associated with each of the angles within the threshold range of light exposure, some embodiments include determining a plurality of target image times. The target image times are determined in an attempt to take an image during the most desirable exposures. Embodiments then include capturing, by a camera system, a plurality of images at the plurality of target image times. The plurality of images can then be used to determine if the window of the lidar device is obstructed.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks, motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles, etc.) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), emergency braking, etc.), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway, etc.) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion, etc.) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118, etc.). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear, etc.).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection, etc.) or in an incoherent detection mode (i.e., time-of-flight mode). In some embodiments, the one or more detectors of the laser rangefinder/lidar 128 may include one or more photodetectors, which may be especially sensitive detectors (e.g., avalanche photodiodes, etc.). In some examples, such photodetectors may be capable of detecting single photons (e.g., single-photon avalanche diodes (SPADs), etc.). Further, such photodetectors can be arranged (e.g., through an electrical connection in series, etc.) into an array (e.g., as in a silicon photomultiplier (SiPM), etc.). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, a night vision camera, etc.) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve, a carburetor, etc.). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor, an application-specific integrated circuit (ASIC), a volatile memory, a non-volatile memory, one or more machine-learned models, etc.) operable to process and analyze images in an effort to determine objects that are in motion (e.g., other vehicles, pedestrians, bicyclists, animals, etc.) and objects that are not in motion (e.g., traffic lights, roadway boundaries, speedbumps, potholes, etc.). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic, etc.) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, control system 106, etc.), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or laser rangefinder/lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 (e.g., a fully autonomous vehicle or semi-autonomous vehicle, etc.) that can include some or all of the functions described in connection with vehicle 100 in reference to FIG. 1. Although vehicle 200 is illustrated in FIGS. 2A-2E as a van with side view mirrors 216 for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices, etc.).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras, etc.), one or more lidars, one or more radars, one or more range finders, one or more inertial sensors, one or more humidity sensors, one or more acoustic sensors (e.g., microphones, sonar devices, etc.), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar system could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; one or more lidars, cameras, and radars; etc.).

Note that the number, location, and type of sensor systems (e.g., 202, 204, etc.) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, to adapt to specialized environmental or application circumstances, etc.). For example, the sensor systems (e.g., 202, 204, etc.) could be disposed in various other locations on the vehicle (e.g., at location 216, etc.) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, range finders, inertial sensors, humidity sensors, and acoustic sensors (e.g., microphones, sonar devices, etc.). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane, etc.). For example, one or more of the sensor systems 202, 204, 206, 208, 210, 212, 214, and/or 218 may be configured to rotate or pivot about an axis (e.g., the z-axis, etc.) perpendicular to the given plane so as to illuminate an environment surrounding the vehicle 200 with light pulses. Based on detecting various aspects of reflected light pulses (e.g., the elapsed time of flight, polarization, intensity, etc.), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz, etc.). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208, 210, etc.), to actively scan the environment near the back of the vehicle 200 for the presence of radio-reflective objects. Similarly, one or more radars can be located near the front of the vehicle 200 (e.g., sensor systems 212, 214, etc.) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors, etc.) used to sense a surrounding environment of vehicle 200. Acoustic sensors may include microphones (e.g., piezoelectric microphones, condenser microphones, ribbon microphones, microelectromechanical systems (MEMS) microphones, etc.) used to sense acoustic waves (i.e., pressure differentials) in a fluid (e.g., air, etc.) of the environment surrounding the vehicle 200. Such acoustic sensors may be used to identify sounds in the surrounding environment (e.g., sirens, human speech, animal sounds, alarms, etc.) upon which control strategy for vehicle 200 may be based. For example, if the acoustic sensor detects a siren (e.g., an ambulatory siren, a fire engine siren, etc.), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1, etc.). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 3:
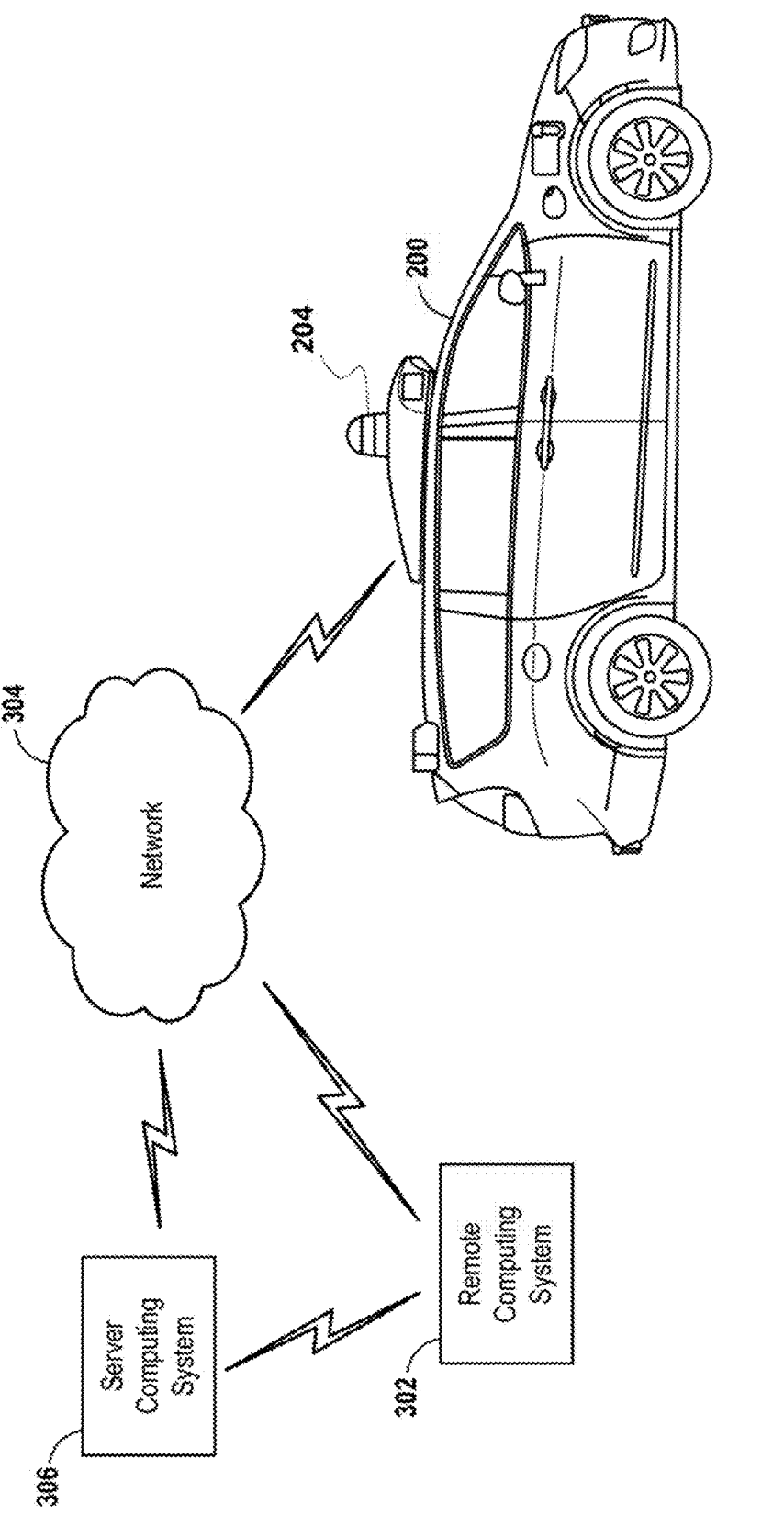
FIG. 3 is a conceptual illustration of wireless communication between various computing systems related to an autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone, etc.), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, a computing system local to vehicle 200, etc.) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200, etc.) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source, etc.) that will be reflected by target objects near the vehicle. The laser range finder may be able to capture the reflected electromagnetic (e.g., infrared light, etc.) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals, etc.), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present, etc.), (ii) confirm whether the vehicle's identification of the object is correct, (iii) correct the identification if the identification was incorrect and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign, etc.), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304, etc.), and in some embodiments, via a server (e.g., server computing system 306, etc.). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction, etc.), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign, etc.), but may be configured to request remote assistance at the same time as (or at a later time from) when the vehicle operates in accordance with the detected object.

Figure 4A:
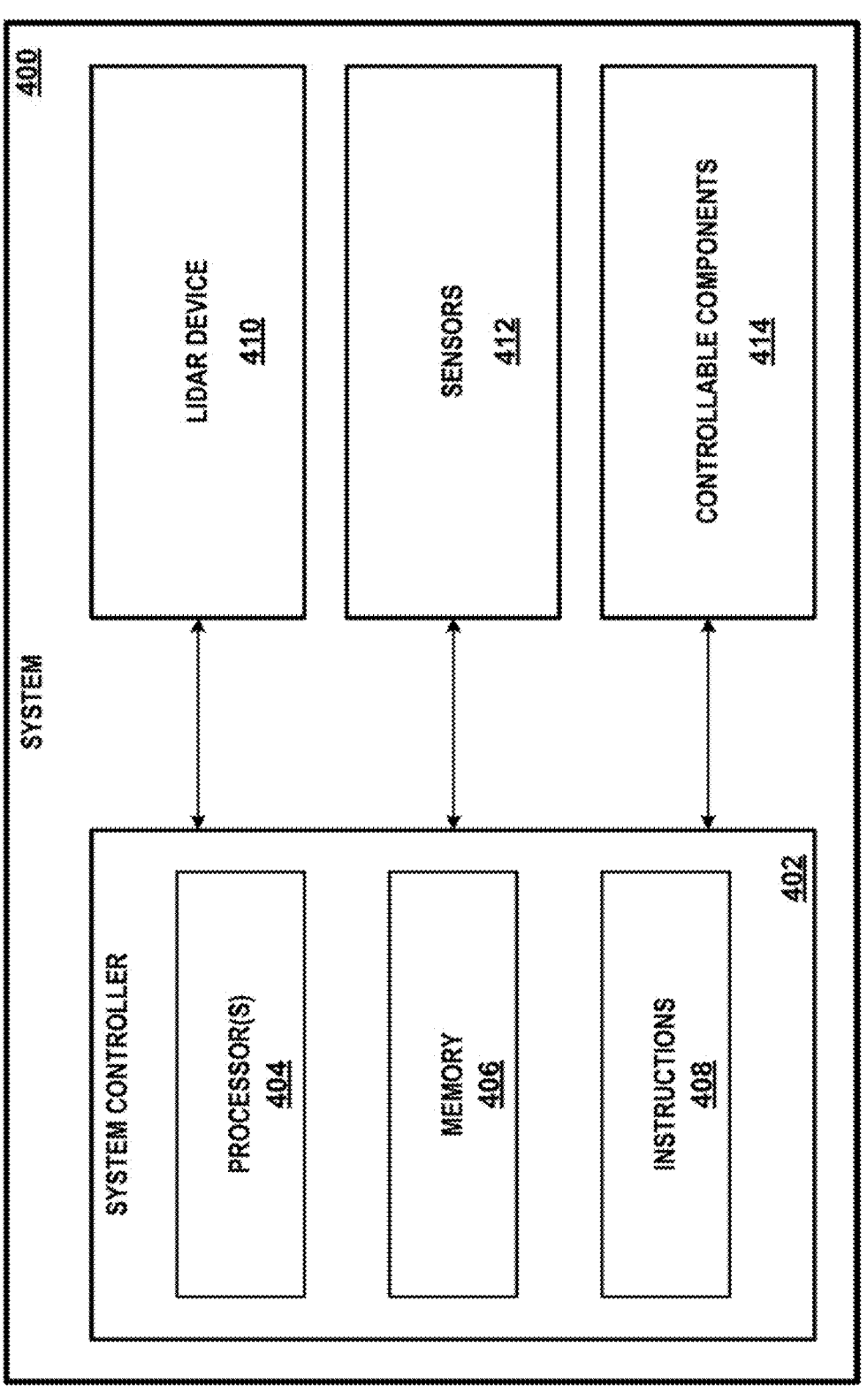
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors (e.g., having a single core or multiple cores, etc.) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory, etc.), a solid state drive (SSD), a hard disk drive (HDD), a Compact Disc (CD), a Digital Video Disk (DVD), a digital tape, read/write (R/W) CDs, R/W DVDs, etc.

The lidar device 410, described further below, includes a plurality of light emitters configured to emit light (e.g., in light pulses, etc.) and one or more light detectors configured to detect light (e.g., reflected portions of the light pulses, etc.). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, proximity sensing, etc.).

Similarly, the system controller 402 may use outputs from the plurality of sensors 412 to determine the characteristics of the system 400 and/or characteristics of the surrounding environment. For example, the sensors 412 may include one or more of a GPS, an IMU, an image capture device (e.g., a camera, etc.), a light sensor, a heat sensor, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous or semi-autonomous mode, etc.). Within examples, the lidar device 410 and the sensors 412 are also controllable by the system controller 402.

Figure 4B:
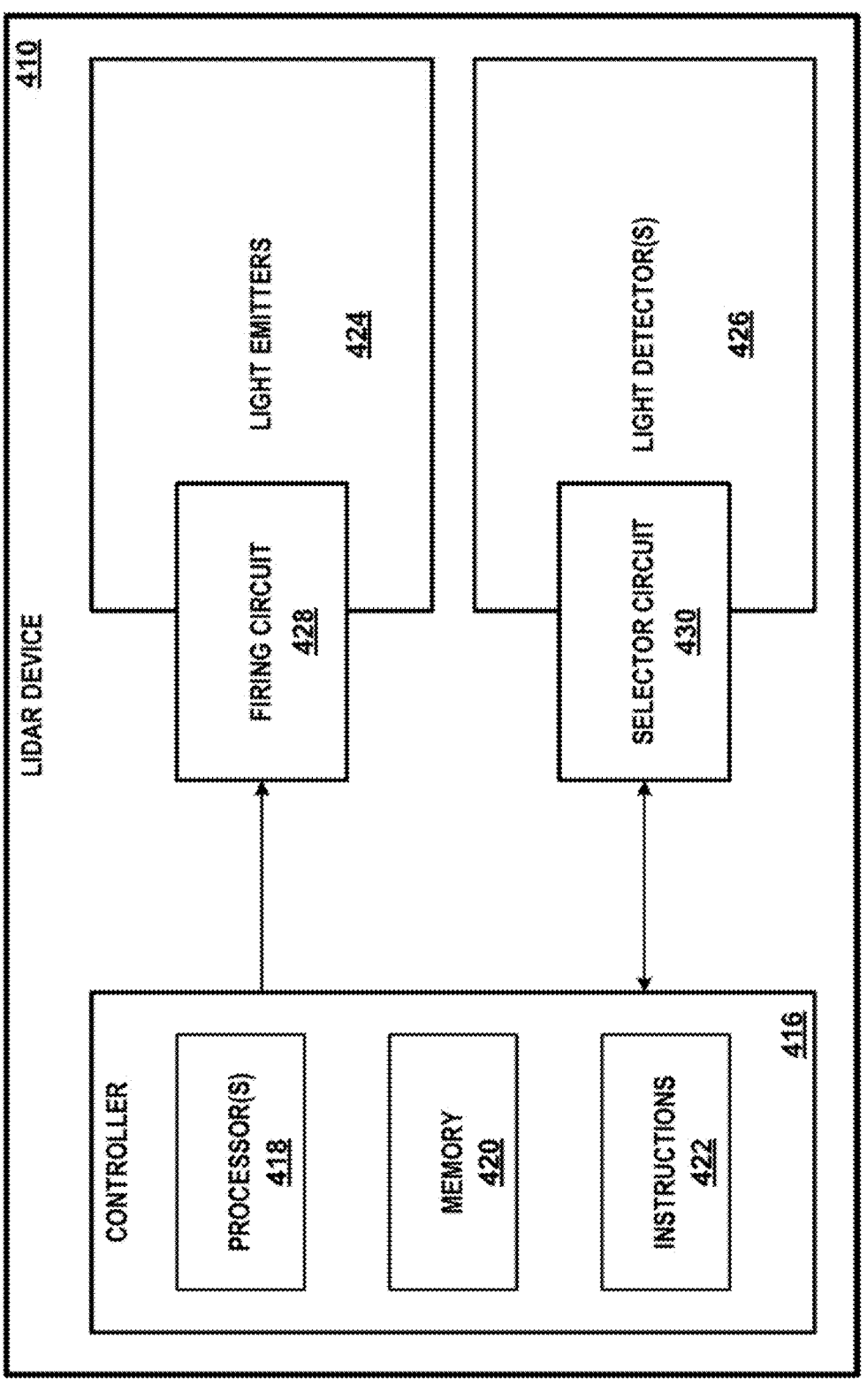
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426, etc. The lidar device 410 further includes a firing circuit 428 configured to select and provide power to respective light emitters of the plurality of light emitters 424 and may include a selector circuit 430 configured to select respective light detectors of the plurality of light detectors 426. The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to memory 406, the memory 420 may include a computer-readable medium, such as a non-transitory, computer-readable medium, such as, but not limited to, ROM, PROM, EPROM, EEPROM, non-volatile random-access memory (e.g., flash memory, etc.), a SSD, a HDD, a CD, a DVD, a digital tape, R/W CDs, R/W DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, construction cones, etc. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system, etc.) and intensities of each reflected light pulse.

As described further below, the firing circuit 428 is used for selecting light emitters for emitting light pulses. The selector circuit 430 similarly is used for sampling outputs from light detectors.

Figure 5:
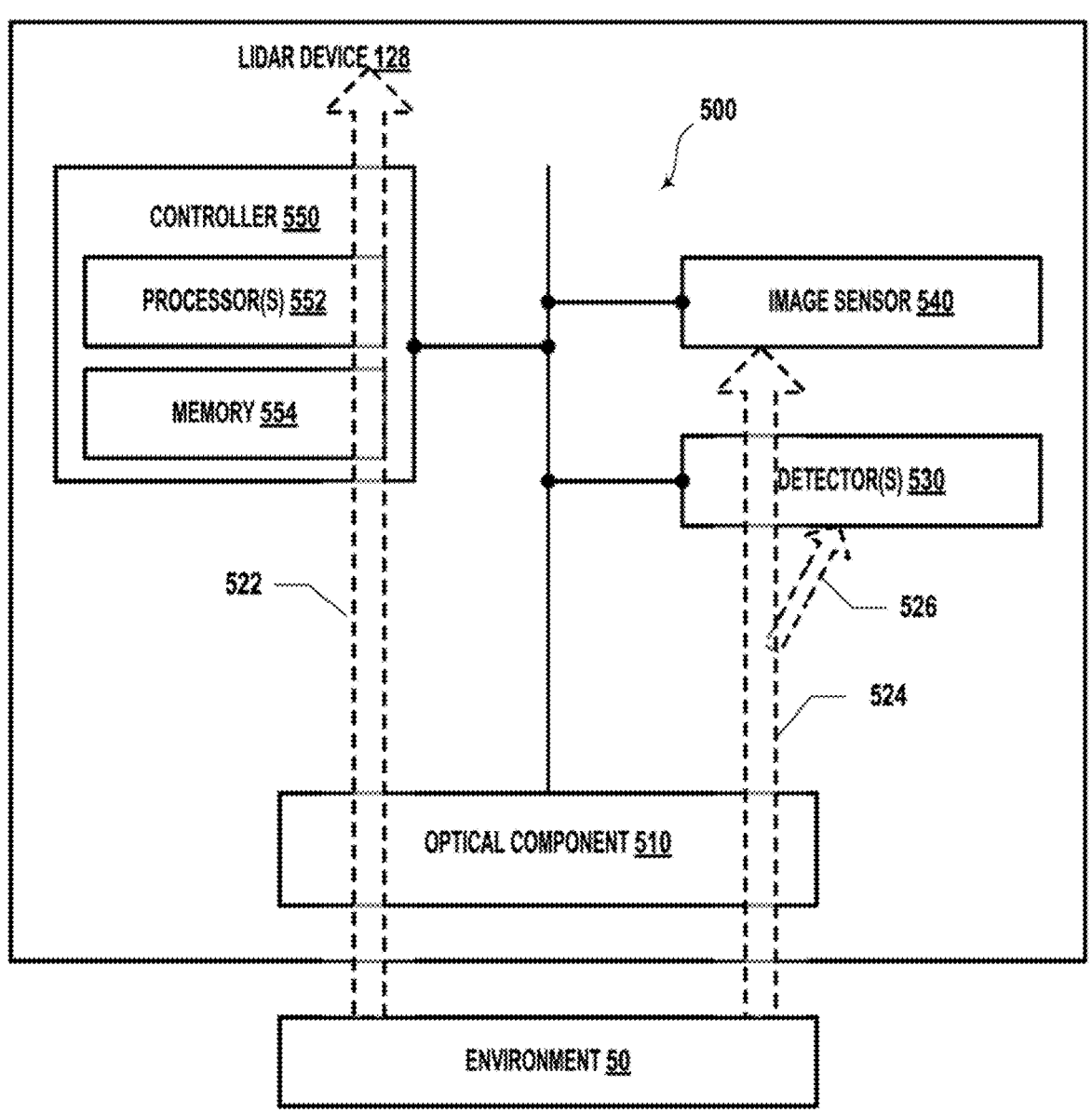
FIG. 5 is an illustration of an optical system interacting with an environment, according to an example embodiment.

FIG. 5 illustrates an optical system 500, according to an example embodiment. As previously mentioned, the optical system 500 can be part of a lidar system, for example lidar unit 528. The optical system 500 can be mounted inside of the lidar system to monitor the lidar dome window and detect if there is any crud on the dome, or damage to the dome. The optical system 500 includes an optical component 510 and one or more light sources 520. In various embodiments, the optical component 510 could include a lens. In such scenarios, the optical component 510 could include one or more piano-convex lenses, a prism lens, a cylindrical lens, a conical lens, and/or other type of lens. However, other types of optical components, such as filters, films, mirrors, windows, diffusers, gratings, and/or prisms are contemplated and possible.

The optical system 500 also includes a detector 530. The detector 530 could be a light-sensitive device that is configured to detect at least a portion of an interaction light signal 524 as a detected light signal 526. In some scenarios, the detector 530 could include at least one of: a charge-coupled device (CCD), a portion of a CCD, an image sensor of a camera, or a portion of an image sensor of a camera. Additionally or alternatively, the detector 530 could include a silicon photomultiplier (SiPM), an avalanche photodiode (APD), a single photon avalanche detector (SPAD), a cryogenic detector, a photodiode, or a phototransistor. Other photo-sensitive devices or systems are possible and contemplated herein.

In some embodiments, the optical system 500 may include an image sensor 540. For example, the image sensor 540 could include a plurality of charge-coupled device (CCD) elements and/or a plurality of complementary metal-oxide-semiconductor (CMOS) elements. In some embodiments, the optical system 500 could include a plurality of image sensors. In an example embodiment, the image sensor 540 could be configured to detect light in the infrared spectrum (e.g., about 700 nanometers to about 1000 nanometers, etc.) and/or within the visible spectrum (e.g., about 400 nanometers to about 700 nanometers, etc.). Using the image sensor 540 to sense light in other spectral ranges (e.g., long-wavelength infrared (LWIR) light having wavelengths between 8-12 microns, etc.) is possible and contemplated herein.

The image sensor 540 could be configured (e.g., sized, dimensioned, etc.) according to an image sensor format. For example, the image sensor 540 could include a full-frame (e.g., 35 millimeter, etc.) format sensor. Additionally or alternatively, the image sensor 540 could include "crop sensor" formats, such as APS-C (e.g., 28.4 mm diagonal, etc.) or one inch (e.g., 15.86 mm diagonal, etc.) formats. Other image sensor formats are contemplated and possible within the scope of the present disclosure.

The optical system 500 additionally includes a controller 550. In some embodiments, the controller 550 could be a read-out integrated circuit (ROIC) that is electrically-coupled to the image sensor 540. The controller 550 includes at least one of a field-programmable gate array (FPGA) or an application-specific integrated circuit (ASIC). Additionally or alternatively, the controller 550 may include one or more processors 552 and a memory 554. The one or more processors 552 may include a general-purpose processor (e.g., having a single core or multiple cores, etc.) and/or a special-purpose processor (e.g., digital signal processors, etc.). The one or more processors 552 may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein. The one or more processors 552 may be configured to execute computer-readable program instructions that are stored in the memory 554. In some embodiments, the one or more processors 552 may execute the program instructions to provide at least some of the functionality and operations described herein.

The memory 554 may include or take the form of one or more computer-readable storage media that may be read or accessed by the one or more processors 552. The one or more computer-readable storage media can include volatile and/or non-volatile storage components, such as optical, magnetic, organic, solid state memory or other memory or disc storage, which may be integrated in whole or in part with at least one of the one or more processors 552. In some embodiments, the memory 554 may be implemented using a single physical device (e.g., one optical, magnetic, organic solid state memory or other memory or disc storage unit), while in other embodiments, the memory 554 can be implemented using two or more physical devices.

As noted, the memory 554 may include computer-readable program instructions that relate to operations of optical system 500. The at least one processor 552 executes instructions stored in the at least one memory 554 so as to carry out operations.

The operations include determining, using a lidar device 128, light intensity information 522 of a surrounding environment 50 of the lidar device 128. The light intensity information 522 could include a plurality of angles within a threshold range of light exposure. In some embodiments, at least one high sensitivity photodiode can integrate an amount of background light sensed over a small window of time to determine an average brightness of the solar background in the surrounding environment. For example, specular reflections off cars might be brighter than diffuse reflections of buildings.

The operations can also include determining rotation times associated with each of the angles within the threshold range of light exposure.

The operations can also include based on the rotation times associated with each of the angles within the threshold range of light exposure, determining a plurality of target image times.

The operations can also include capturing, by a camera system, a plurality of images at the plurality of target image times.

Figure 6A:
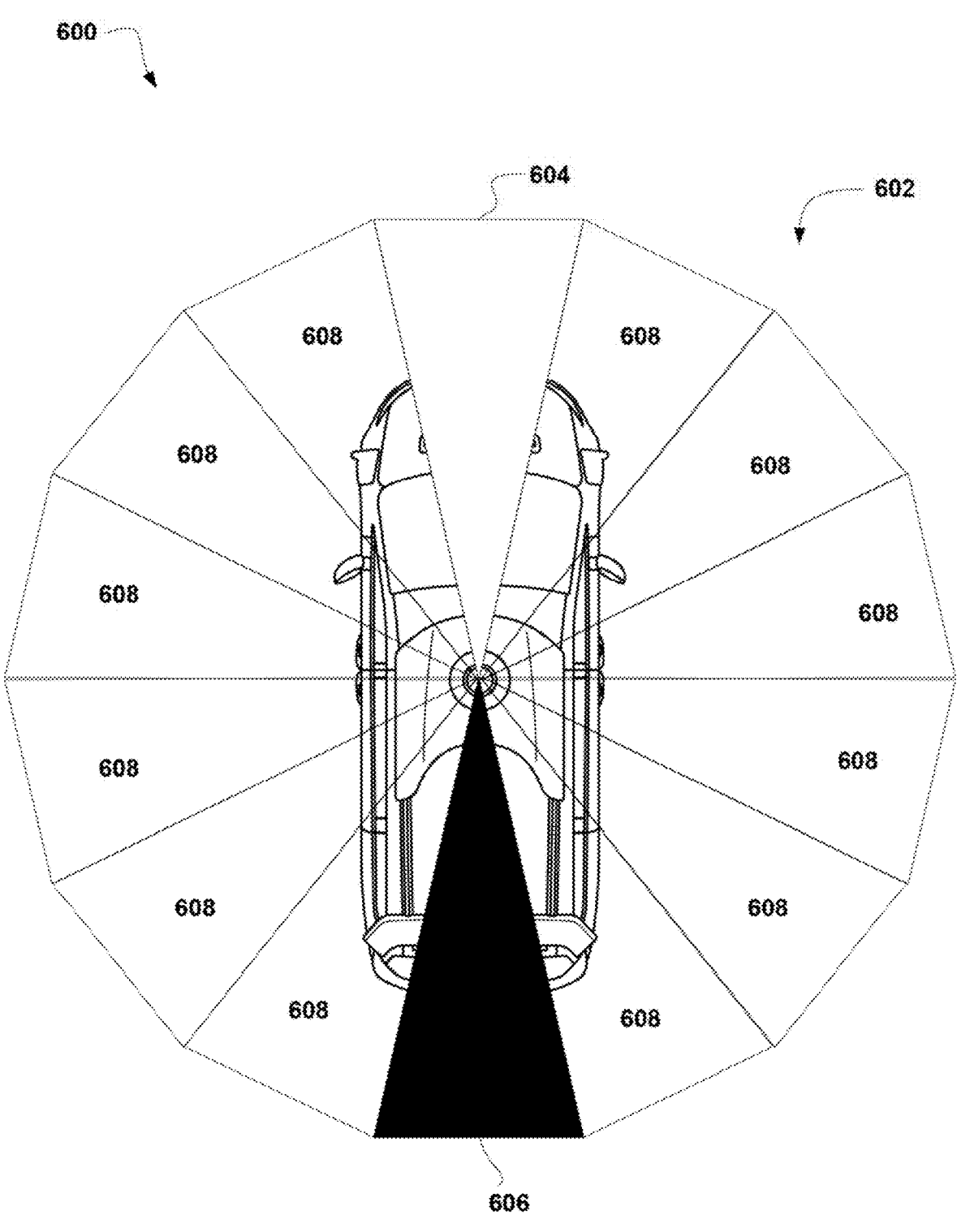
FIG. 6A is an illustration of background light at different angles relative to the lidar device, according to example embodiments.
Figure 6B:
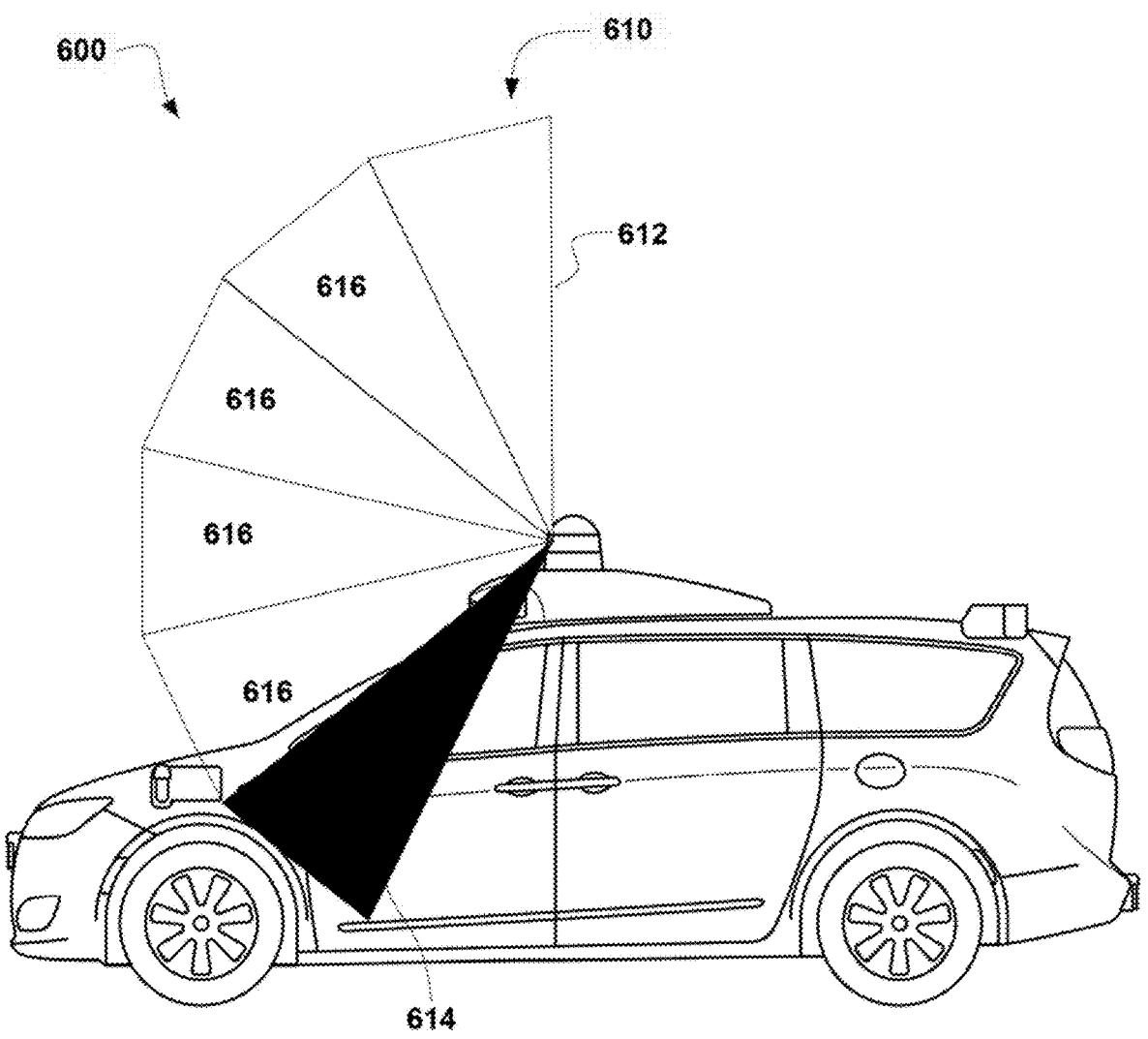
FIG. 6B is an illustration of background light at different angles relative to the lidar device, according to example embodiments.

FIGS. 6A and 6B illustrates an environment surrounding a lidar device on a vehicle 600. The surrounding environment is segmented into a plurality of angles 602. The Figures further illustrate a first angle with high light exposure 604, a second angle with low light exposure 606, and a plurality of angles within the threshold range of light exposure 608 detected by the lidar device. An example embodiment can include taking images with the obscuration-detection camera at rotation times associated with the angles within the threshold range of light exposure so that the exposure time is consistent throughout the images. In this way, the same exposure setting can be used for taking the images, thus improving the quality of the images and cutting down on processing time.

In an example embodiment, FIG. 6A illustrates a scenario where average background light is very bright in front of the vehicle and very dark in the back of the vehicle. This scenario could take place, for example, while leaving a tunnel on a sunny day. When the obscuration-detection camera is pointed back into the tunnel, average background light is dark so a longer exposure time should be used to avoid an underexposed image. When the camera is pointing forward into the sun, a short exposure time should be used to avoid an overexposed image. However, by taking the images at the angles associated with the average background brightness within the threshold range of light exposure, the same exposure time can be used for all of the images. By attempting to have consistent exposure times for all of the images, processing can be reduced. The images can then be used to determine if the lidar window is being obstructed.

In an example embodiment, FIG. 6B illustrates a scenario where average background light is very bright above the vehicle due to the sun, and also very bright towards the vehicle due to the sun's reflection. This scenario could take place during a particularly sunny day. The surrounding environment is segmented into a plurality of elevation angles 610. The Figures further illustrate a first angle with high light exposure 612, a second angle with low light exposure 614, and a plurality of angles within the threshold range of light exposure 616 detected by the lidar device. Similar to in FIG. 6A, the images can be taken at times when the lidar device, and camera, are facing the angles associated with the average background brightness within the threshold range of light exposure.

FIG. 7 is a flowchart diagram of a method 700, according to example embodiments. One or more blocks of the method 700 may be performed by the computer system 112 illustrated in FIG. 1, in various embodiments. In some embodiments, one or more of the blocks of the method 700 may be performed by a computing device (e.g., a controller of one or more components of the optical system 500, etc.). The computing device may include computing components such as a non-volatile memory (e.g., a hard drive, a read-only memory (ROM), etc.), a volatile memory (e.g., a random-access memory (RAM), such as dynamic random-access memory (DRAM), static random-access memory (SRAM), etc.), a user-input device (e.g., a mouse, a keyboard, etc.), a display (e.g., an LED display, a liquid-crystal display (LCD), etc.), and/or a network communication controller (e.g., a WIFI® controller, based on IEEE 802.11 standards, an Ethernet controller, etc.). The computing device, for example, may execute instructions stored on a non-transitory, computer-readable medium (e.g., a hard drive, etc.) to perform one or more of the operations contemplated herein.

At block 702, the method 700 may include determining, using a lidar device, light intensity information of a surrounding environment of the lidar device. The light intensity information can include a plurality of angles within a threshold range of light exposure. At block 704 the method may include determining rotation times associated with each of the angles within the threshold range of light exposure. At block 706 the method can include determining a plurality of target image times based on the rotation times associated with each of the angles within the threshold range of light exposure. At block 708, the method can include capturing, by a camera system, a plurality of images at the plurality of target image times.

In some embodiments of the method 700, the lidar device is constantly spinning. The device can keep track of the angle that the lidar is currently facing while it spins and can determine light intensity information of the surrounding environment of the lidar with a plurality of high sensitivity photodiodes, which can be integrated into the lidar device. Alternatively, native-photosensitive elements of the lidar can be used to determine the light intensity information. The native-photosensitive elements of the lidar can be the one or more photodetectors, previously described, which may be especially sensitive detectors (e.g., avalanche photodiodes, etc.). In some examples, such photodetectors may be capable of detecting single photons (e.g., single-photon avalanche diodes (SPADs), etc.). Further, such photodetectors can be arranged (e.g., through an electrical connection in series, etc.) into an array (e.g., as in a silicon photomultiplier (SiPM), etc.). In some examples, the one or more photodetectors are Geiger-mode operated devices and the lidar includes subcomponents designed for such Geiger-mode operation. The photodetectors can be used by the lidar device to sense and direct light pulses that return after being emitted.

The light intensity information can include an average brightness for a plurality of angles of the surrounding environment of the lidar device. For example, the lidar device can sense an average background light of the surrounding environment as the lidar device spins, and can associate the sensed background light values with the particular angle that the lidar was facing at the time. The light intensity information can further include a background light brightness of the surrounding environment of the lidar device that has at least low light exposure and high light exposure. Particularly, the light intensity information can include a plurality of angles that the lidar device faced with low light exposure, and a plurality of angles that the lidar device faced with high light exposure. Low light exposure could be considered any brightness below approximately 100 lumens per meter squared and high light exposure could be considered any brightness above 15,000 lumens per meter squared.

Figure 8:
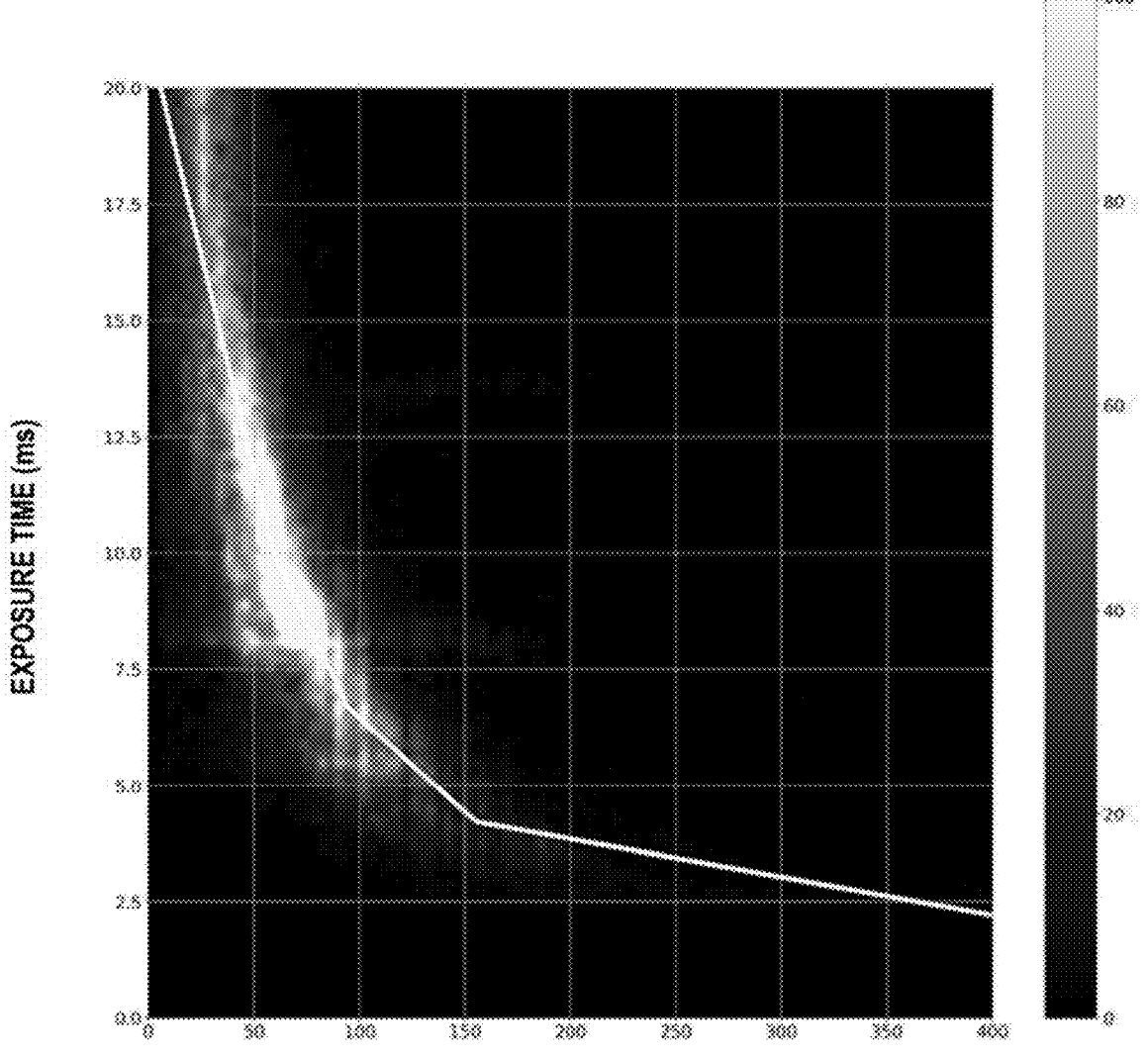
FIG. 8 is an illustration for converting background light to light exposure time, according an example embodiment.

In an example embodiment of the method 700, the average brightness of each of the angles in the plurality of angles can be converted to an exposure time. For example, FIG. 8 illustrates a lookup table to convert average background brightness to light exposure time. Different sensors can be used to measure the average background light, and the different kinds of sensors can have different light sensitivity levels. In the table, the units for the average background light depend on the device being used to gather them and can therefore be arbitrary. In an example embodiment, the photodetectors of the lidar device can be used to gather the raw average background light in lumens. Using the lookup table, the raw average background light can then be correlated to an appropriate exposure time for that background light. In additional embodiments, a different mapping can be used to translate background brightness into light exposure time. For example, the data could be fitted to a polynomial.

In an example embodiment of the method 700, the light intensity information can include a plurality of angles. The plurality of angles can be determined by the lidar device. They can be at least one of a plurality of yaw angles and a plurality of elevation angles. Specifically, for a plurality of yaw angles, the lidar device can keep track of the angle that the lidar device is facing while the lidar device rotates about a vertical axis. For elevation angles, the lidar device could rotate about an orthogonal axis and the lidar device could keep track of the angle. The plurality of angles can be within a threshold range of light exposure. The range of light exposure can be a plurality of exposure times for the camera. For example, usable ranges for light exposure on most cameras extend from lower than 1 millisecond to 25 milliseconds. In an example embodiment, the threshold range of exposure time could be from 5 milliseconds to 15 milliseconds. In an alternative embodiment, the threshold range of exposure can be anywhere from 1 millisecond to 25 milliseconds To determine the light intensity information of the surrounding environment of the lidar device, where the light intensity information includes a plurality of angles within a threshold range of light exposure, an example embodiment of method 700 can include measuring, using the lidar device, average background light for a plurality of fixed-size yaw sectors. The plurality of fixed-size yaw sectors can be a selected portion of the 360 degree rotation of the lidar device. The size of the sectors can depend on the lidar rotational frequency and the threshold range of light exposure along with the capable frame rate of the obstruction-detection camera. For example, the size of the yaw sector can be the rotational frequency of the lidar device multiplied by the threshold exposure time multiplied by 360 degrees. Additionally, the 360 degree rotation of the lidar device can be split into 14 equally sized sectors. Other numbers of equally sized sectors can also be possible, for example, 4 fixed-size yaw sectors which are divided equally, etc. The sectors can also be divided unequally by varying the speed of the lidar device or the exposure time of the obstruction-detection camera. In additional embodiments, the yaw sectors can be sized by an interpolating function, or dynamically sized based on the surrounding environment of the lidar device. For example, the size of the yaw sectors can be varied based on background illumination in the environment.

The light intensity information for the plurality of fixed-size yaw sectors can then be converted to an exposure time for the plurality of fixed-size yaw sectors. As previously mentioned, the light intensity information can be converted into exposure time using at least one of a look-up table or a mapping technique. The embodiment can then include determining a subset of the plurality of fixed-size yaw sectors that is within the threshold range of light exposure. For example, the threshold range of light exposure can be from 5 milliseconds to 15 milliseconds. Based on the look-up table, or mapping techniques, whichever fixed-sized yaw sectors included light intensity information corresponding to the threshold range, are the fixed-sized yaw sectors within the subset of the plurality. In an additional embodiment, the desired exposure time could be selected based on the light intensity within each fixed-sized yaw sector. For example, the light intensity can be summed within each yaw sector, and then the exposure time can be selected such that the image time aligns with the position of the yaw sector. The light intensity can also be summed over multiple yaw sectors to determine a desired exposure time.

Some embodiments of the method 700 include determining rotation times associated with each of the angles within the threshold range of light exposure. The rotation times can be determined based on the known angle the lidar device is facing and the constant speed of rotation of the lidar device. As the lidar device spins, a computing device associated with the lidar, such as computer system 112 or controller 550, can keep track of the angle that the lidar is facing relative to the front of the vehicle. For example, the lidar facing the center front of the vehicle can be zero degrees and 360 degrees, while the lidar facing the center back of the vehicle can be 180 degrees. Similarly, if the lidar has multiple scanning axes, the computing device associated with the lidar can keep track of the angles of elevation that the lidar is facing. For example, the lidar facing up can be zero degrees.

In an example embodiment, the angles can be grouped into fixed sized sectors. For example, zero to ten degrees, ten to twenty degrees, etc. Alternatively, the angles are not grouped together, and can instead be considered singularly.

In addition to the computing system associated with the lidar device monitoring the angle that the lidar device is facing, the camera system can also monitor a plurality of angles spanned by the rotation of the lidar device. The camera system can correspond to the same computing device at the lidar device, such as computer system 112 or controller 550. Alternatively, the computer system can include its own computing device. The camera system can monitor the plurality of angles spanned by the lidar device and use the angles to determine when to take an image. The plurality of angles spanned by the lidar device can be the angle that the lidar is facing from zero to 360 degrees.

Once the plurality of angles is determined, and the angles within the threshold light exposure are determined, rotation times can be associated with each of the angles within the threshold light exposure. The lidar, and the obstruction-detection camera attached thereto, can spin at a constant speed of rotation. For example, the lidar can spin at 10 Hz. Using the constant speed of rotation of the lidar device and the plurality of angles spanned by the rotation of the lidar device, the rotation times associated with each of the angles within the threshold range of light exposure can also be determined.

An example embodiment of the method 700 can include, based on the rotation times associated with each of the angles within the threshold range of light exposure, determining a plurality of target image times. Specifically, the camera system can take images at the image times that are associated with the angles in the threshold range of light exposure. In this way, the images can be taken with desired light exposure times in an attempt to avoid under or over-exposed images. The plurality of target image times can be set during the plurality of rotation times associated with the plurality of angles within the threshold range of light exposure. For example, the target image times could be any time associated with 45 degrees to 90 degrees, assuming 45 degrees to 90 degrees was within the threshold range of light exposure.

The target image times can further be adjusted to avoid times that are not within the threshold. The plurality of target image times can be adjusted by varying image readout blank lines. Image readout blank lines are a parameter in example embodiments of the camera module. The image readout blank lines do not include any image data, but can be used to change the frames per second. In an example embodiment, varying image read out blank lines includes at least one of increasing a camera read out time of an image frame before a subsequent image frame, or decreasing the camera read out time of the image frame before the subsequent image frame. By increasing the number of blank lines, the camera readout time is increased and therefore the start time of the subsequent frame is delayed. Similarly, by decreasing the number of blank lines, the camera readout time is decreased and the start time of the subsequent frame is moved up. By increasing or decreasing the blank lines, the system can manipulate the time that the image is taken to be at an angle that is within the threshold for light exposure. In an example embodiment, one additional blank line can delay the subsequent frame by 54.792 microseconds. Multiple blank frames can be used to achieve the desired position for taking the image. In alternative embodiments, the blank lines can correspond to other times.

An example embodiment of the method 700 can include capturing, by the camera system, a plurality of images at the plurality of target image times. By taking the plurality of images at the target image times, the images can be taken using the desired exposure time across all of the images. The time that the images are taken to achieve the target image times can be varied as described above and can be taken using a streaming camera to process the plurality of images in real time. In an alternative embodiment the camera system could also be any camera configured to capture still images and/or video. For example, a non-streaming camera can also capture the plurality of images. The non-streaming camera can include at least one camera that stores the plurality of images to be processed at a later time. The plurality of images can be taken at the plurality of target times with the desired exposure times across all of the images and can be stored to determine, at a later time, if the lidar window is occluded. Once the plurality images are taken at the target image times, they can be used to determine if the lidar device is occluded. Specifically, the plurality of images can be used to determine if any crud is on the lidar window, or if the lidar window is damaged in any way.

An example embodiment of the method 700 can also include determining a second plurality of angles that are outside of the threshold range of light exposure for the camera system to avoid taking images at those angles and times. The embodiment can include, using the lidar device to determine that the light intensity information further includes a second plurality of angles outside of the threshold range of light exposure. The lidar device can determine the angles and the average background light for each of the angles as previously discussed. The average background light can then be converted to exposure time. As previously mentioned, the threshold range of light exposure can be 5 milliseconds to 15 milliseconds. The second plurality of angles can have light exposures that are outside of the threshold range, and therefore would not be preferable for taking images at.

Using the methods previously described, the computing system can determine rotation times associated with all of angles that the lidar device faces while spinning. This includes determining rotation times associated with each of the second plurality of angles outside of the threshold range of light exposure. Based on the rotation times associated with each of the second plurality of angles outside the threshold range of light exposure, the computing system can determine a plurality of undesirable image times. The plurality of undesirable image times could include times that, if an image is taken during them, would produce an image with undesirable light exposure. Therefore, in response to determining the plurality of undesirable image times, the computing system associated with the camera system can vary image readout blank lines in order to avoid the angles that have light exposure that is outside of the threshold.

Since the plurality of images are taken at angles that use similar exposure times in an attempt to harmonize the plurality of images, some example embodiments described herein can include using the same signal processing across the plurality of images. Specifically, the images are taken at specific angles and have similar average background light and similar fields of view so they can be processed similarly. For example, sequential frame processing techniques can be used across the plurality of images. Normally, sequential frame processing is not an option for sensors that are spinning 360 degrees over time because a plurality of images are taken at different angles that include different background lights. For example, frame subtraction to subtract out a background effect cannot be used because two different portions of the field of view are in the image frames. However, since the plurality of images are taken at specific angles, the field of view between image frames is similar. Thus, images taken at similar angles can be background subtracted to determine if the lidar window is occluded. Similarly, since the average background light is similar across the images, any background illumination can be subtracted from the images. Therefore, illuminator on and off sequencing and background subtraction all become more usable as a result of this method.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   determining, using a lidar device that rotates through a plurality of angles, light intensity information of a surrounding environment of the lidar device, wherein the light intensity information comprises a background light brightness for each angle of the plurality of angles;
   determining one or more particular angles of the plurality of angles for which the background light brightness correlates to an exposure time that is within a threshold range of exposure times;
   determining rotation times when the lidar device will rotate through the one or more particular angles;
   based on the rotation times, determining a plurality of target image times; and
   capturing, by a camera system, a plurality of images at the plurality of target image times.

2. The method of claim 1, wherein the plurality of target image times are adjusted by varying image readout blank lines.

3. The method of claim 2, wherein varying the image readout blank lines comprises at least one of increasing a camera read out time of an image frame before a subsequent image frame, or decreasing the camera read out time of the image frame before the subsequent image frame.

4. The method of claim 1, wherein the plurality of target image times comprises the rotation times.

5. The method of claim 1, wherein the camera system is a streaming camera.

6. The method of claim 1, further comprising determining, based on the plurality of images, the lidar device is occluded.

7. The method of claim 1, wherein determining, using the lidar device, the light intensity information of the surrounding environment of the lidar device comprises:
   measuring, using the lidar device, an average background light brightness for each sector of a plurality of fixed-size yaw sectors associated with the plurality of angles.

8. The method of claim 1, wherein the plurality of angles comprises at least one of a plurality of yaw angles or a plurality of elevation angles.

9. The method of claim 1, wherein the rotation times are based on a constant speed of rotation of the lidar device.

10. The method of claim 1, further comprising converting the background light brightness for each angle of the plurality of angles to a corresponding exposure time.

11. The method of claim 10, further comprising capturing the plurality of images with the corresponding exposure times.

12. The method of claim 1, wherein the threshold range of exposure times is between 5 milliseconds and 15 milliseconds.

13. The method of claim 1, wherein determining one or more particular angles of the plurality of angles for which the background light brightness correlates to the exposure time that is within the threshold range of exposure times is based on a lookup table.

14. The method of claim 1, wherein the background light brightness of at least one angle of the plurality of angles is below 100 lumens per meter squared or above approximately 15,000 lumens per meter squared.

15. The method of claim 1, wherein the plurality of angles spans from 0 degrees to 360 degrees.

16. A non-transitory, computer-readable medium having instructions stored thereon, wherein the instructions, when executed by a processor, cause the processor to execute a method comprising:

determining, using a lidar device that rotates through a plurality of angles, light intensity information of a surrounding environment of the lidar device, wherein the light intensity information comprises a background light brightness for each angle of the plurality of angles;

determining one or more particular angles of the plurality of angles for which the background light brightness correlates to an exposure time that is within a threshold range of exposure times;

determining rotation times when the lidar device will rotate through the one or more particular angles;

based on the rotation times, determining a plurality of target image times; and capturing, by a camera system, a plurality of images at the plurality of target image times.

17. The non-transitory, computer-readable medium of claim 16, wherein the plurality of target image times are adjusted by varying image readout blank lines.

18. The non-transitory, computer-readable medium of claim 16, wherein determining, using the lidar device, the light intensity information of the surrounding environment of the lidar device further comprises:

measuring, using the lidar device, an average background light brightness for each sector of a plurality of fixed-size yaw sectors associated with the plurality of angles.

19. The non-transitory, computer-readable medium of claim 16, wherein the plurality of angles comprises at least one of a plurality of yaw angles or a plurality of elevation angles.

20. An optical system comprising:

a lidar device configured to rotate through a plurality of angles; and a controller configured to perform an imaging routine, wherein the imaging routine comprises:

determining, using the lidar device, light intensity information of a surrounding environment of the lidar device, wherein the light intensity information comprises a background light brightness for each angle of the plurality of angles;

determining one or more particular angles of the plurality of angles for which the background light brightness correlates to an exposure time that is within a threshold range of exposure times;

determining rotation times when the lidar device will rotate through the one or more particular angles;

based on the rotation times, determining a plurality of target image times; and capturing, by a camera system, a plurality of images at the plurality of target image times.

* * * * *